United States Patent
Von Wendorff

(10) Patent No.: US 8,145,953 B2
(45) Date of Patent: Mar. 27, 2012

(54) PROGRAMMABLE UNIT

(75) Inventor: Christophorus W. Von Wendorff, Munich (DE)

(73) Assignee: Infineon Technologies AG (DE)

( * ) Notice: Subject to any disclaimer, the term of this patent is extended or adjusted under 35 U.S.C. 154(b) by 2474 days.

(21) Appl. No.: 10/491,072

(22) PCT Filed: Sep. 25, 2002

(86) PCT No.: PCT/DE02/03644
§ 371 (c)(1),
(2), (4) Date: Sep. 27, 2004

(87) PCT Pub. No.: WO03/029979
PCT Pub. Date: Apr. 10, 2003

(65) Prior Publication Data
US 2005/0034010 A1    Feb. 10, 2005

(30) Foreign Application Priority Data
Sep. 28, 2001 (DE) .................. 101 48 157

(51) Int. Cl.
G06F 11/00 (2006.01)
G01R 31/28 (2006.01)
(52) U.S. Cl. .......................... 714/45; 714/725
(58) Field of Classification Search .............. 714/725, 714/45
See application file for complete search history.

(56) References Cited

U.S. PATENT DOCUMENTS

| | | | |
|---|---|---|---|
| 3,763,474 A | | 10/1973 | Freeman et al. |
| 4,216,539 A | * | 8/1980 | Raymond et al. ............. 714/734 |
| 4,761,768 A | * | 8/1988 | Turner et al. ............. 365/185.22 |
| 4,766,569 A | * | 8/1988 | Turner et al. ............. 365/185.11 |
| 5,090,015 A | * | 2/1992 | Dabbish et al. ............... 714/733 |
| 5,479,618 A | * | 12/1995 | Van de Steeg et al. ......... 700/23 |
| 5,867,507 A | * | 2/1999 | Beebe et al. .................. 714/726 |
| 5,878,051 A | * | 3/1999 | Sharma et al. ................. 714/724 |
| 5,978,937 A | * | 11/1999 | Miyamori et al. .............. 714/45 |
| 6,108,806 A | * | 8/2000 | Abramovici et al. ......... 714/725 |
| 6,115,832 A | | 9/2000 | Zydek et al. |
| 6,256,758 B1 | * | 7/2001 | Abramovici et al. ......... 714/724 |
| 6,874,110 B1 | * | 3/2005 | Camarota ..................... 714/733 |
| 7,036,059 B1 | * | 4/2006 | Carmichael et al. .......... 714/725 |

FOREIGN PATENT DOCUMENTS

| | | |
|---|---|---|
| DE | 29 03 638 C2 | 8/1980 |
| DE | 37 04318 A1 | 8/1988 |
| DE | DD 290 965 A5 | 6/1991 |
| DE | DD 290 967 A5 | 6/1991 |
| DE | 44 46 314 A1 | 6/1996 |
| DE | 195 11 842 A1 | 10/1996 |
| DE | 197 07 454 A1 | 8/1998 |
| WO | WO 00/54155 A1 | 9/2000 |

* cited by examiner

*Primary Examiner* — Joseph D Torres
(74) *Attorney, Agent, or Firm* — Dickstein Shapiro LLP

(57) ABSTRACT

A program-controlled unit including a monitoring device, which compares a value, depending on the flow of the program executed by the program-controlled unit, with a preset value, in response to a particular event or in relation to a particular point in time. Errors occurring in a program-controlled unit can thus be detected in a reliable and economical manner under all circumstances.

18 Claims, 1 Drawing Sheet

PROGRAMMABLE UNIT

FIELD OF THE INVENTION

The present invention relates to programmable units.

BACKGROUND OF THE INVENTION

The design and function of programmable units such as microprocessors, microcontrollers and signal processors, etc., are known and require no further explanation.

One known problem with programmable units is that they can operate incorrectly for widely differing reasons. This is a major problem, particularly when using programmable units in safety-critical systems, for example when using programmable units for controlling an antilock braking system (ABS) or for controlling an airbag. Programmable units which are used in systems such as these have to operate correctly in all circumstances or, at least, it has to be possible to ensure that the system changes to a defined state when a fault occurs.

By far the most widely used option for this purpose is to design such systems to be redundant, that is to say to contain two or more specific components such as programmable units or parts of them, memory devices, etc.

If the redundantly provided components are operated in parallel, that is to say they carry out the same actions at the same time, then it is possible by comparison of specific results, states or events to determine whether and if appropriate which of the redundantly provided components is or are operating incorrectly and to automatically replace a component which is operating incorrectly by a correctly operating component, or to change the system to a defined state.

However, only those faults which do not occur at the same time in the redundantly provided components can be identified in this way. For example, the same fault can occur at the same time in two or more components in the event of brief drops in the supply voltage. In order to make it possible to identify faults such as these, it is possible to provide for the redundantly provided components to operate with a certain time offset. Faults which occur at the same time in redundantly provided components then have different effects, and it is possible to compare the results, states or events in order to determine whether and, if appropriate, which of the redundantly provided components is or are operating incorrectly.

However, this type of fault identification does not always work. In particular, faults which occur while the redundantly provided components are in the sleep mode cannot be identified. The fact that faults which occur in the sleep mode are not identified may at first glance appear to be insignificant. However, if these faults result in the same remaining change in the redundantly provided components, this is actually of major importance. This is because faults such as these cannot be identified after waking up the redundantly provided components. The system then appears to be operating correctly even though this is in reality not in fact the case.

SUMMARY OF THE INVENTION

The present invention is therefore directed to finding a possible way in which faults which occur in a programmable unit can be identified reliably with little complexity in all circumstances.

The programmable unit according to the invention is distinguished in that the programmable unit contains a monitoring device which compares a value which is dependent on the running of the program which is carried out by the programmable unit with a predetermined value in response to a specific event or at a specific time.

This makes it possible in a simple manner, in particular without having to provide two or more of certain system components or parts of them, to identify faults which occur in the programmable unit at any time and in all circumstances.

Advantageous developments of the invention can be found in the dependent claims, in the following description and in the figures.

BRIEF DESCRIPTION OF THE DRAWINGS

The invention will be explained in more detail in the following text using an exemplary embodiment and with reference to the figures, in which.

DESCRIPTION OF A PREFERRED EXEMPLARY EMBODIMENT

The programmable unit described in the following text is a microcontroller. The special features of the microcontroller which are described in more detail in the following text may, however, also be used for any desired other programmable unit, for example for microprocessors or signal processors.

Figure 1:
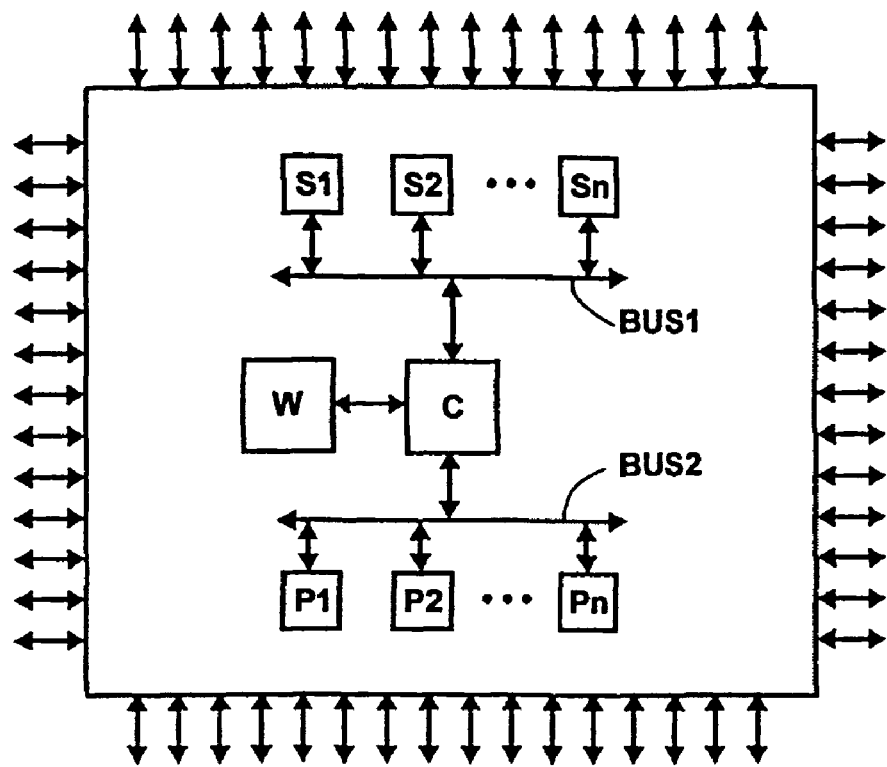
FIG. 1 shows the basic design of the programmable unit described in the following text.

FIG. 1 shows the design of the microcontroller under consideration. For the sake of completeness, it should actually be mentioned at this point that only those parts of the microcontroller which are of particular interest in the present case are illustrated and described.

The microcontroller which is shown in FIG. 1 contains a core C, memory devices S 1 to Sn which are connected to the core C via a first bus BUS1, peripheral units P1 to Pn which are connected to the core C via a second bus BUS2, as well as a monitoring device W which is connected to the core (and possibly also to further components of the microcontroller).

The core C reads from the memory devices S1 to Sn or from an external memory device, which is not shown in FIG. 1 and is provided outside the microcontroller, data which represents commands and operands, and carries them out.

The memory devices S1 to Sn may be formed by a ROM, a flash memory, a RAM, or by any other desired memory devices.

The peripheral units P1 to Pn are, for example, an A/D converter, a timer, a coding device, a DMA controller, a CAN controller, a USB controller, or other devices which can be integrated in microcontrollers.

The monitoring device W monitors the correct operation of the core C.

The monitoring device W
  receives from the core C data which depends on the running of the program which is carried out by the core C,
  determines a specific characteristic of this data when required,
  compares the received data or the data which represents the specific characteristics of this data with previously defined data in response to predetermined events or at predetermined times, and
  assumes that the core C is operating correctly if the compared data items match, and
  assumes that the core C is not operating correctly if the compared data items do not match, and takes suitable actions in order—to the extent that this is possible in the given circumstances—to maintain or to reproduce the safety of the system containing the microcontroller.

The data which the monitoring device W receives from the core C is, for example:

the addresses from which the commands carried out by it are read, and/or the data which represents the commands carried out, and/or the addresses from which the operands which are required to carry out commands are read, and/or the operands which are used.

In this case, it is also possible to provide for only selected addresses and/or data to be transmitted to the monitoring device W, or for the monitoring device W to take account of only selected addresses and/or data, for example only the addresses of every nth command, or only commands and/or operands which are stored at an address within a specific address range, or which are at that time not stored at an address within a specific address range.

Independently of this, the monitoring device W is preferably supplied only with such data, or the monitoring device W takes account of only such data, which is related to the commands which are carried out by the core C, that is to say for example not commands, operands and/or addresses of commands or operands which are loaded by prefetches but in the end are not carried out.

The data mentioned above and which is supplied to the monitoring device W from the core C makes it possible to draw more or less accurate conclusions about the actions carried out by the core C.

In addition to the data mentioned above, or instead of it, the monitoring device W may also be supplied with any other desired data allowing monitoring of the actions carried out by the core C. For example it is possible for the monitoring device W to be supplied from the core C or from some other component of the microcontroller (for example a timer) with information which represents a time. This information, which is referred to in the following text as time data, may indicate the time which has passed since a specific reference time, or may indicate the time at which other data which is supplied to the monitoring device W, for example a command address, was requested, received and/or used by the core C. In this case, the monitoring device W is not only able to check whether the actions to be carried out by the microcontroller have in fact been carried out, and/or whether these actions have been carried out in the correct sequence, but also whether the relevant actions have been carried out at the correct time.

Particularly when relatively large amounts of data are involved, which have to be taken into account by the monitoring device W in each time unit, it has been found to be advantageous for the monitoring device W not to base the comparison carried out by it on the data supplied to the monitoring device W itself, but on a different value which is formed on the basis of this data. This other value in the example under consideration is a signature which is formed from the data which is supplied to the monitoring device W between two comparisons. This signature is, for example, formed by:

addition of the data items which are supplied successively to the monitoring device W, or addition of the CRCs (cyclic redundancy checksums) of the data items which are supplied successively to the monitoring device W, or addition of the parities of the data items which are supplied successively to the monitoring device W, or logic or arithmetic linking of data representing other characteristics of the data items which are supplied successively to the monitoring device W.

In this case, it is also possible to provide for the contributions which the data that is supplied to the monitoring device makes to the signature to be weighted differently in accordance with a defined scheme. For example, it is possible to provide for the CRC of an address which is supplied to the monitoring device to be weighted once, while in contrast the CRC of the time data relating to that address is weighted twice, and/or for the CRCs of data items which are supplied successively to the monitoring device to be weighted differently.

The signature, which is dependent on the running of the program which is carried out by the core C, is formed, in the example under consideration, by a signature generator that is provided in the monitoring device W.

The value formed by the signature generator or the data supplied from the core C to the monitoring device W is compared with a predetermined different value in the monitoring device.

The predetermined different value is a value which is determined during or after program development. This is the value which—provided that the program to be carried out by the core C has been carried out correctly—matches the data with which it is compared in the monitoring device W. In the example under consideration, the predetermined value is stored in one of the memory devices S1 to Sn of the microcontroller, and is transferred from the core C to the monitoring device W before the comparison is carried out. If the monitoring device W has to monitor not only a specific program or a specific program part, but also different programs or program parts, then different predetermined values which are associated with the different programs or program parts are stored in the memory devices S1 to Sn, and these different values are transferred to the monitoring device W.

The comparison is carried out on the occurrence of a specific event, or at predetermined times.

The specific events on whose occurrence a comparison is carried out may be detected by the monitoring device W itself or by some other component of the microcontroller. A specific event such as this may, for example, be the core C carrying out a specific command or a command which is stored at a specific address. It should be obvious and requires no further explanation that any other desired events may also be used as the stimulus for carrying out a comparison.

The result of the comparison can be used to identify whether the microcontroller has been operating correctly. In this case—depending on the way in which the signature is formed—it is possible to check:

whether the core has carried out the commands which it should have carried out since the last comparison, and/or whether it has carried out the commands in the correct sequence, and/or whether it has carried out the commands at the correct time.

Figure 2:
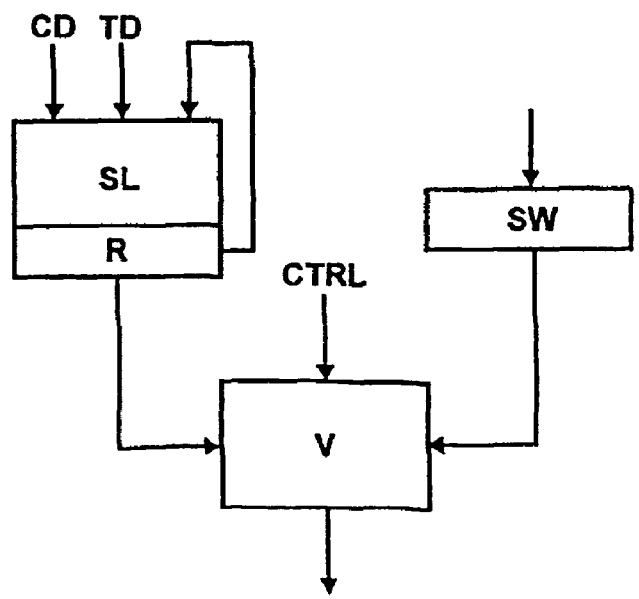
FIG. 2 shows the design of a monitoring device for the programmable unit as shown in FIG. 1.

The basic design of the monitoring device W is illustrated in FIG. 2.

The monitoring device W contains a signal generator SG, a memory device SW, and a comparison device V, with the signal generator SG comprising a signal logic SL and a register R.

The signal logic SL is supplied with
- the addresses, commands and/or operands which are supplied to the monitoring device W from the core C and are denoted by the reference symbol CD,
- time data TD, which indicates the time at which the data CD was requested, received or used by the core C, and
- the data which is stored in the register R.

The signature logic SL uses this data to form the signature which has already been mentioned above, and writes this signature to the register R. In this case, the procedure is for the signature logic SL to determine, from the data CD and TD, the information which is relevant for signature formation, for example the CRC, whenever it receives a new data item CD, for example a command address from the core C, to add this to the content of the register R, and to write the result of the addition to the register R. The register R may be set to 0 by a device which is not shown in FIG. 2. This makes it possible to define when the signature formation process should in each case be restarted.

The memory device SW is used for storage of the predetermined value with which the signature which is stored in the register R is compared on the occurrence of a specific event or at a specific time. The predetermined value (set value of the signature) is stored in one of the memory devices S1 to Sn or in an external memory device which is provided outside the microcontroller, and is transferred by the core C to the memory device SW.

When a specific event occurs or at a specific time, the comparison device V compares the content of the register R with the content of the memory device SW. The specific event which may be used for this purpose has already been mentioned by way of example above. The comparison device V has a control connection via which it is signaled to it by means of a control signal CTRL when a comparison should be carried out. The control signal CTRL may be produced within or outside the monitoring device W.

If the comparison device V finds that the values compared by it match, this means that the microcontroller is operating correctly. If the comparison device finds that the compared values do not match, this means that the microcontroller is not operating correctly. In this case, suitable actions must be taken in order to reproduce the correct operation of the system containing the microcontroller, or to change the system containing the microcontroller to a defined state. This may be done, for example, by the monitoring device W or a microcontroller component which cooperates with it emitting an interrupt request in the event of a comparison result which signals a mismatch. In this case, it is possible to provide for the output signal from the comparison device V also to be used as an interrupt request signal. It would also be possible to provide for the microcontroller to be reset in the event of a comparison result which signals a mismatch. In this case, it is possible to provide for the output signal from the comparison device V also to be used as a reset signal.

Additionally or alternatively, it is, however, also possible to provide for actions to be carried out by the microcontroller, for example the initiation of the airbag in a motor vehicle, to be made dependent on the output signal on the comparison device V, that is to say for the airbag to be initiated only when the output signal from the comparison device V signals that the compared values match.

The described monitoring device may be used in various ways.

A first possible way in which it can be used is for the described monitoring to be carried out only in specific phases, for example after the microcontroller has been started up or when the microcontroller is changed back to the active state after an inactive phase, as is the case, for example, when the microcontroller is switched from the sleep mode to the normal mode. In situations such as this it is possible to provide for the microcontroller, before starting the activity that is required of it (that is before carrying out the program which is actually to be carried out), to carry out a test program, and for the monitoring described above to check that the test program is being carried out correctly.

Another possible way to use the monitoring device W is for the monitoring device to monitor that the application program to be carried out by the microcontroller, or specific parts of the application program, is or are carried out correctly.

In both cases, it is also possible to check whether specific commands or all of the commands are carried out at a predetermined time.

This makes it possible, by way of example but not exclusively, to monitor whether an application program is carried out correctly, which program comprises a specific number of tasks which are processed repeatedly in a predetermined sequence, and whose execution normally in each case takes exactly a predetermined time period. One such application program, for example, is a program which, in the fault-free normal case, starts to carry out a task A at the time t=0, starts to carry out a task B at the time t=10 ms, starts to carry out a task C at the time t=30 ms, and starts to carry out a task D at the time t=35 ms, etc. If, with an application program such as this, provision is additionally made that the tasks cannot be interrupted by interrupts etc., then, if the system is operating correctly, the process of carrying out a specific task must in each case be started precisely at the defined times. This can be monitored reliably by the described monitoring device W. All that is necessary for this purpose is to check whether the first command of the new task has actually been fetched or carried out at the time at which a task change should take place, and/or whether the time at which the first command for the task is fetched corresponds to the predetermined task change time.

In this context, it should be noted that an application program which operates as just described is ideally suitable for systems which have to operate correctly in all circumstances and which, if this is not the case or is in question, must immediately be changed to a defined state or must be reset. Specifically, with a program such as this, it is reliably possible in a very simple manner to prevent safety-significant actions, such as the control of the airbag or of the ABS of a motor vehicle, from not being carried out at all owing to interrupts or other disturbances, not being carried out sufficiently frequently, or being carried out only at excessively long time intervals, or being interrupted while being carried out. The fact that an application program such as this cannot process interrupts, or in any case cannot process them to the normal extent, is not a disadvantage. The only tasks which need be provided are those which check those system components which output interrupt requests until that time and react to them, in accordance with possible requirements.

It is evident from the above statements that the monitoring device W can check more reliably and more comprehensively whether the microcontroller which is being monitored by the monitoring device is operating correctly. In particular, and in contrast to those devices which have been provided until now in order to make it possible to identify faults in the microcontroller or faults in the system which contains the microcontroller, the monitoring device W can determine whether the commands to be carried out by the microcontroller are actually being carried out, and/or whether they are being carried out in the correct sequence, and/or whether they are also being carried out at the correct time. In this case, the monitoring device W can be used to identify faults in the microcontroller or in the system containing the microcontroller in an even less complex manner than the devices which have been provided until now. In particular, there is no need to have to provide two or more of certain system components.

The described monitoring device thus provides a capability to reliably identify faults occurring in a programmable unit, with little complexity and in all circumstances.

List of Reference Symbols
BUSX Bus
C Core
Px Peripheral unit
R Register
SG Signature generator
SL Signature logic
SW Memory device
Sx Memory device
V Comparison device
W Monitoring device

I claim:

1. A programmable unit comprising:
   a core configured to execute a program for safety-critical systems;
   a memory configured to store a predetermined value; and
   a monitoring device configured to:
   a) receive data relating to the execution of the program and generated during execution of the program,
   b) compare the data with a predetermined value in response to at least one of a specific event and at a specific time, and
   c) generate an output signal based on the comparison.

2. The programmable unit as claimed in claim 1, wherein the monitoring device is configured to receive data relating to addresses of commands executed by the core.

3. The programmable unit as claimed in claim 1, wherein the monitoring device is configured to receive data relating to commands executed by the core.

4. The programmable unit as claimed in claim 1, wherein the monitoring device is configured to receive data relating to addresses of operands executed by the core.

5. The programmable unit as claimed in claim 1, wherein the monitoring device is configured to receive data relating to operands executed by the core.

6. The programmable unit as claimed in claim 1, wherein the monitoring device is configured to receive data relating to a time interval following a specific reference time.

7. The programmable unit as claimed in claim 6, wherein the time interval indicates a time at which other data relating to the execution of the program was requested, received or used by the programmable unit.

8. The programmable unit as claimed in claim 1, wherein the monitoring device comprises a signature generator configured to generate a signature which is dependent on the data relating to the execution of the program.

9. The programmable unit as claimed in claim 8, wherein the signature generator comprises signature logic configured to generate the signature, and a register configured to store the signature.

10. The programmable unit as claimed in claim 9, wherein the signature logic is configured to:
    a) associate the data relating to the execution of the program with a value which represents a specific characteristic of the data, wherein the association is made using one of an arithmetic operation and a logic operation to the content of the register,
    b) generate a signature based on the association, and
    c) write the signature to the register.

11. The programmable unit as claimed in claim 10, wherein the value which represents the specific characteristic of the data is a cyclic redundancy checksum of the data.

12. The programmable unit as claimed in claim 10, wherein the value which represents the specific characteristic of the data is a parity value of the data.

13. The programmable unit as claimed in claim 9, wherein the signature logic includes means for adding the data relating to the execution of the program to the content of the register.

14. The programmable unit as claimed in claim 1, wherein the predetermined value matches the data relating to the execution of the program when the programmable unit is operating correctly.

15. The programmable unit as claimed in claim 1, further comprising means for generating an interrupt request when the data relating to the execution of the program does not match the predetermined value.

16. The programmable unit as claimed in claim 15, further comprising means for resetting the programmable unit when the data relating to the execution of the program does not match the predetermined value.

17. The programmable unit as claimed in claim 1, wherein the output signal is used to determine whether an action is to be carried out by the programmable unit.

18. The programmable unit as claimed in claim 1, wherein the monitoring device uses the output signal to determine whether a specific command has been carried out at a specific time.

* * * * *